United States Patent [19]

Mirell

[11] 3,843,961

[45] Oct. 22, 1974

[54] METHOD FOR PROVIDING A LUMINOUS MULTI-COLOR IMAGE

[75] Inventor: Stuart G. Mirell, Tempe, Ariz.

[73] Assignee: Spectradyne, Tempe, Ariz.

[22] Filed: Oct. 11, 1973

[21] Appl. No.: 405,562

[52] U.S. Cl. .................................. 358/81, 178/7.87
[51] Int. Cl. .............................................. H04n 9/12
[58] Field of Search ............. 178/5.4 R, 5.4 E, 7.85, 178/7.86, 7.87; 358/81, 55

[56] References Cited

UNITED STATES PATENTS

| | | | |
|---|---|---|---|
| 2,611,817 | 9/1952 | Schwarz | 178/5.4 E |
| 2,731,511 | 1/1956 | Wiesen | 178/5.4 CF |

FOREIGN PATENTS OR APPLICATIONS

| | | | |
|---|---|---|---|
| 445,978 | 4/1936 | Great Britain | 178/7.87 |

*Primary Examiner*—Robert L. Richardson
*Attorney, Agent, or Firm*—William H. Drummond

[57] ABSTRACT

A luminous multi-color image such as a television picture or projected motion picture is provided by forming a luminous variative-intensity monochrome color image having bright, dark and intermediate areas and simultaneously uniformly superimposing on the monochrome image an illumination of a second visually distinguishable color. The intensity of the superimposed illumination is adjusted such that in the bright areas of the variative-intensity image, the monochrome color "washes out" the second visually distinguishable color. In the dark areas of the variative-intensity image, the second color predominates. The intermediate areas of the variative-intensity image appear as mixtures of the monochrome color and the second visually distinguishable color.

The monochrome image may either be a self-luminous image formed on the face of a cathode ray tube or an image projected onto a viewing screen by a variety of techniques such as a slide projector, motion picture projector, etc. The second visually distinguishable color is uniformly superimposed on the monochrome image by either projecting it on a transparent viewing screen placed between the luminous image and the observer or by direct projection upon the same screen on which the luminous image is formed.

By this method, a luminous multi-color image can be provided even though the signal forming the variative-intensity image contains no color information. For example, by proper selection of colors, a black-amd-white video image can be transformed into a multi-color image which is a first approximation of the true colors of the objects portrayed by the black-and-white picture.

7 Claims, 4 Drawing Figures

METHOD FOR PROVIDING A LUMINOUS MULTI-COLOR IMAGE

This invention relates to a method for providing a luminous multi-color image.

In a more particular aspect, the invention concerns a method for converting a light or electrical signal containing no color information to a luminous multi-color image.

In a still further and more specific respect, the invention relates to a method for transforming a black-and-white television or film projected luminous image into a luminous multi-color image in which the objects forming the image are portrayed in at least a first approximation of their true color.

Prior workers have expended considerable effort in providing multi-color luminous displays such as by projection from multi-color film slides and by forming multi-color images on the face of video tubes. However, such prior efforts have generally included the step of forming an electrical or light signal containing color "information." The formation of such coded signals, in turn, generally requires complicated and somewhat expensive techniques. It would therefore be highly desirable to provide a simplified method for forming luminous multi-color images. It would be specially desirable to provide such a method for transforming a signal having no color information into a luminous multi-color image which portrays objects and scenes in at least a first approximation of true color.

Accordingly, it is the principal object of the invention to provide a simplified method for forming a luminous multi-color image.

Yet another object of the invention is to provide such a method which is capable of transforming a light or electrical signal having no color information to provide a luminous multi-color image.

Still another object of the invention is to provide a method whereby black-and-white kinescope or film-projected images can be presented to the viewer in at least a first approximation of the true color.

These and other, further and more specific objects and advantages of the invention will be apparent to those skilled in the art from the following detailed description thereof taken in conjunction with the drawings, in which.

Figure 3:
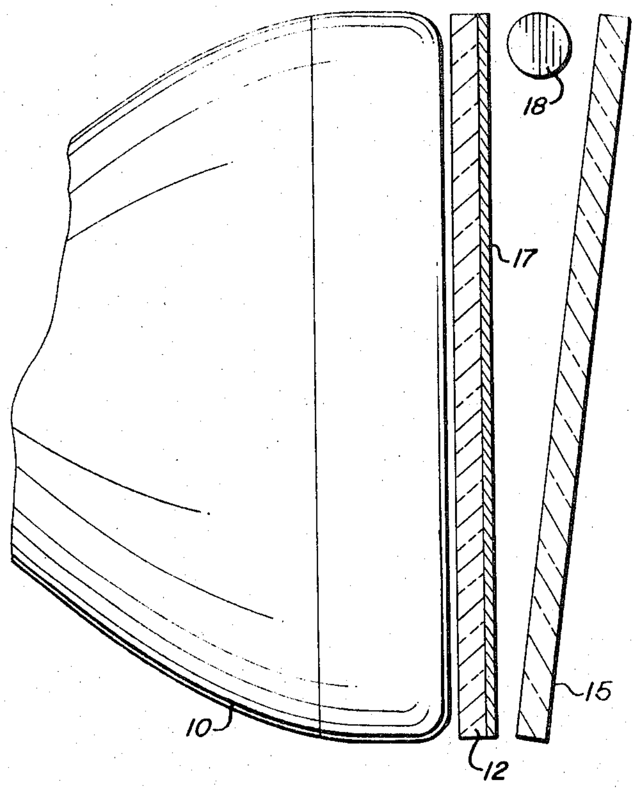
Figure 4:
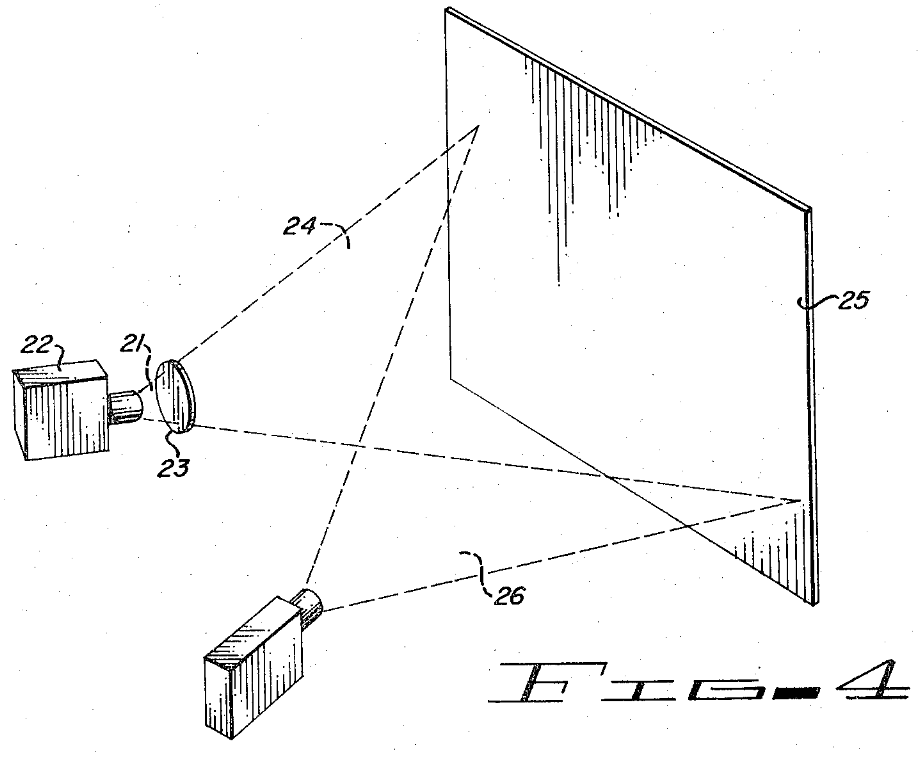

FIG. 3 is a cross-sectional view schematically depicting apparatus which, according to a further preferred embodiment of the invention, provides for transformation of a black-and-white TV picture into a multi-color image; and FIG. 4 is a perspective schematic view of apparatus adapted for transforming a black-and-white projected image into a multi-color image according to another embodiment of the method of the invention.

Briefly, the method of the invention provides a luminous multi-color image by forming a luminous variative-intensity monochrome color image having bright, dark and intermediate areas and simultaneously uniformly superimposing on the monochrome image an illumination of a second visually distinguishable color. The intensity of the superimposed illumination is adjusted such that the bright areas of the variative-intensity image appear in the monochrome color, the dark areas thereof appear in the second color, and the intermediate areas thereof appear in colors which are mistures of the monochrome color and the second visually distinguishable color. The monochrome color image can be formed by various alternative techniques, for example, by first forming a luminous variative-intensity image on a viewing screen (such as a black-and-white video picture on a TV screen or a moving or still picture on a projection screen) and then interposing a filter in front of the viewing screen which filters the light emanating therefrom to a monochrome color. Alternatively, the monochrome color image may be formed by filtering a light signal containing variative-intensity image information and then projecting the filtered light onto a viewing screen to produce the monochrome color image. Of course, the monochrome color image may also be "directly" formed, for example, by utilizing a phosphor coating on the screen of a CRT tube which directly emits a monochrome color instead of the usual white-emitting CRT phosphor.

The second visually distinguishable color can be superimposed on the monochrome color image by projecting light of the second color onto a transparent viewing screen placed between the monochrome color image and the viewer. Alternatively, the second color can be superimposed on the monochrome image by projecting light of the second color directly onto the viewing screen on which the monochrome color image is formed.

According to the presently preferred embodiment of the invention, the second visually distinguishable color is superimposed on the monochrome color image by projecting ultraviolet light onto a transparent viewing screen, coated with a UV-excitable phosphor which is positioned between the monochrome image and the viewer. Alternatively, and in accordance with this preferred embodiment, the UV-excitable phosphor coating is carried directly on the viewing screen on which the monochrome color image is formed.

The intensity of the superimposed illumination of the second visually distinguishable color is adjusted to be relatively low in comparison with the peak intensity of the variative-intensity image such that, to the viewer, the bright areas of the variative-intensity image appear in the monochrome color (the low-intensity second color illumination being "washed out"), the dark areas of the variative-intensity image appear in the second low-intensity color, and the areas of intermediate brightness of the variative-intensity image appear in colors produced by the mixture of the monochrome color and the second color.

As used herein, the term "monochrome color" means either a chromatic or an achromatic color which is visually perceptible and distinguishable from other such colors because of differences in either "hue" or "saturation" or both. In this sense, the term "monochrome" is not limited to a color represented by radiation of a single wavelength so long as the color resulting from a combination of two or more radiations of different wavelengths (whether contiguous or not) is visually perceptible and distinguishable from other colors represented by radiation of other single or combination wavelengths. Likewise, the term "monochrome" also includes colors of the same hue (either single or a combination of wavelengths) which are distinguishable from each other on account of saturation or vividness.

Further, as used herein, the term "second visually distinguishable color" means, simply, a second color which is "monochrome," as defined above, which is perceptible and visually distinguishable from the first monochrome color.

For most practical applications of the invention described herein, the "monochrome color" and the "second color" will at least be found in different ones of the 267 ISCC-NBS name blocks published by the Inter-Society Color Council and the National Bureau of Standards as the "ISCC-NBS Method of Designating Colors and Dictionary of Color Names" (NBS circular 553, National Bureau of Standards, Washington, D.C., 1955). In fact, for most practical purposes, the "monochrome" and "second" colors will be found in different ones of the 27 "color name pockets" of the ISCC-NBS system. However, since it is estimated that man can distinguish several million surface colors, it is only necessary for the purposes of this description and the appended claims that the "monochrome" and "second" colors be visually perceptible and distinguishable.

The particular combination of monochrome and second colors is not critical, according to the broadest aspects of the invention, so long as they are visually perceptible and distinguishable. If the monochrome and second colors are perceptible and visually distinguishable, as described above, a multi-color image will be provided. However, in certain applications of the invention, a first approximation of color realism can be achieved by appropriate selection of the monochrome and second colors. For example, in many scenes, the bright areas contain a rather high content of reddish colors and a rather low content of blue-green colors. This is particularly evident in an indoor scene illuminated by red-rich incandescent light. If the monochrome image is medium-saturation orange and the second color is blue-green, flesh tones of such a scene are rendered quite accurately since they are generally bright areas of the scene and, in accordance with this invention, are viewed in the monochrome orange. Utilizing the same color combination to produce a multicolor outdoor scene, the dark areas of foliage assume a blue-green coloration of low brightness, dark cloudy skies appear as medium-brightness blue-green, and a bright sky will appear as the bright-sunset orange.

The combination of colors and the results described above are presented solely for illustrative purposes. It will be immediately apparent to those skilled in the art that the method disclosed herein is not limited to the use of the orange and blue-green colors mentioned above or of any particular combination of colors. So long as the two colors are visually distinguishable, a multi-color image will be produced; the selection of the particular colors depends on the desired effect.

Figure 1:
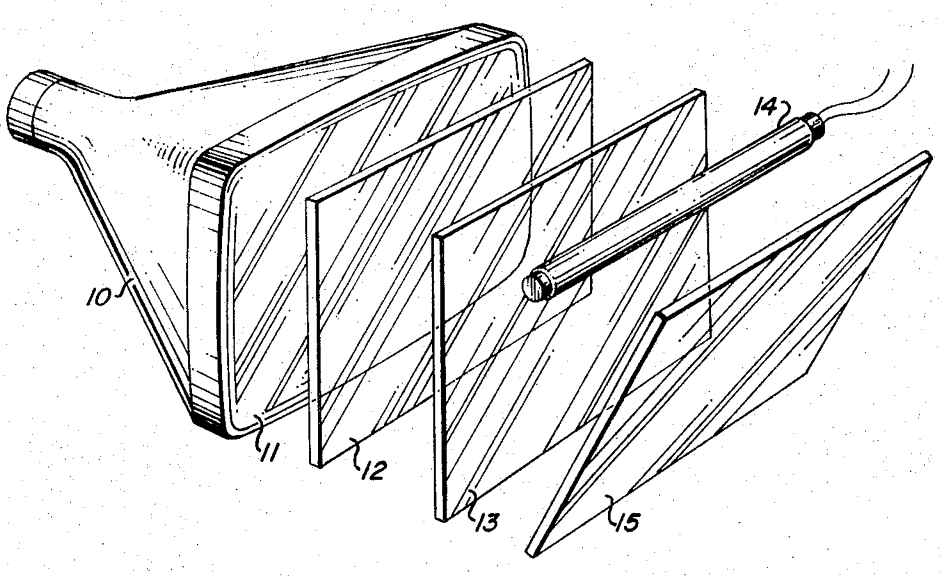
FIG. 1 is an exploded perspective view illustrating one embodiment of the method of the invention and depicting apparatus useful in practicing the method to convert a black-and-white TV image to a multi-color image.
Figure 2:
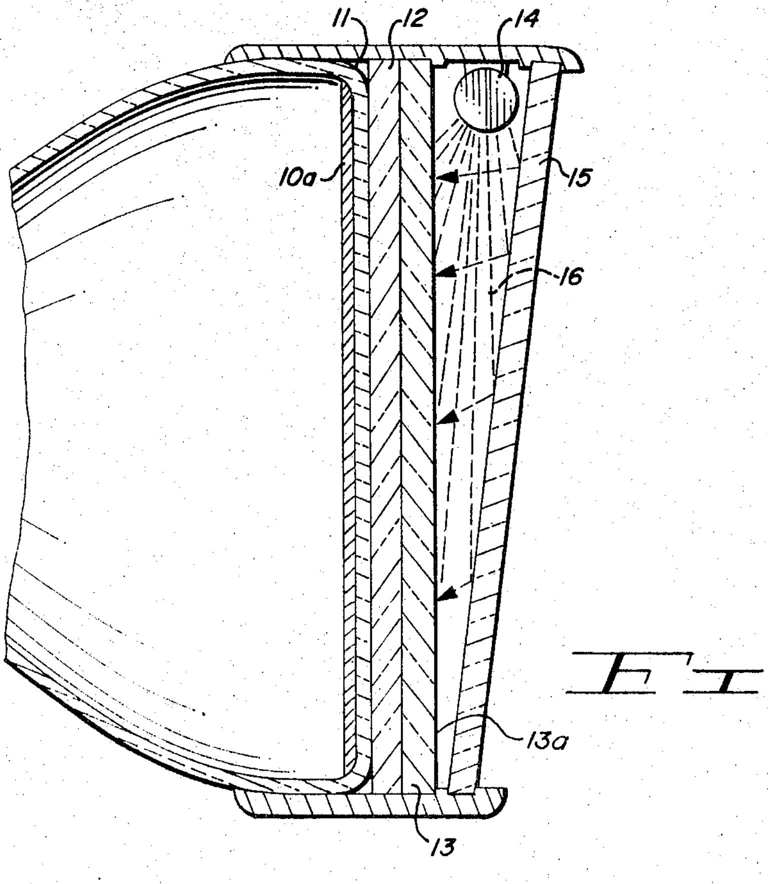
FIG. 2 is a cross-sectional view showing the elements of the apparatus of FIG. 1 in assembled operative relation.

Turning now to the drawings, FIGS. 1–2 depict apparatus useful in accordance with the practice of the presently preferred embodiment of the invention. FIG. 1 depicts a cathode ray tube 10 of the type typically used in a standard black-and-white television receiver. The inside surface of the screen 11 carries a coating **10*a* of a standard white-emitting CRT phosphor such as "P-15." The screen 11 of the CRT 10 is covered with an optical filter 12 that passes a specific spectral range of the visible wave lengths constituting a monochrome color. A viewing-scattering screen member 13 in front of the filter 12 passes all visible wave lengths and serves to scatter light emitted from the light source 14. A transparent screen 15 is placed in an inclined position, as shown in FIGS. 1 and 2, to provide maximum reflection of the light from the light source 14, as indicated by the dashed lines 16. The viewing screen 13 is transparent to the monochrome image formed on the CRT screen 11 but the forward surface 13*a* is etched or otherwise treated to scatter the light emitted from the source 14. Alternatively, in accordance with the presently preferred embodiment of the invention, the front surface 13*a* of the screen member 13 is impregnated with a phosphor which emits the second color illumination and the second color phosphor on the surface 13*a* is excited by ultraviolet radiation from a UV lamp 14.**

In accordance with an alternate of the above-described presently preferred embodiment, the screen 13 of FIGS. 1–2 can be omitted and, as shown in FIG. 3, the filter 12 is provided with a surface impregnation 17 of a suitable UV-excitable phosphor which emits the second color illumination when excited by ultraviolet radiation from a UV lamp 18. In the apparatus of FIG. 3, screen 15 serves the dual function of reflecting ultraviolet light from the source 18 to the phosphor-impregnated surface 17 of the filter 12 and also that of absorbing any ultraviolet light which is not so reflected. In both embodiments illustrated in FIGS. 1–3, the filter 12 also prevents short wave lengths from reaching the CRT 10 which could excite the CRT phosphor and thereby reduce the contrast. In operation, the embodiments illustrated by FIGS. 1–3 operate as follows. The light emitted from the variative-intensity black/white image formed by the excitation of the phosphor **10*a* of the CRT 10 is filtered by the filter 12 to a monochrome color, suitably medium-saturation orange. The resulting monochrome color image is viewed through the light-reflecting screen 15 and the screen 13 which is either illuminated by light emanating from the source 14 (FIGS. 1–2) or which is produced by excitation of the phosphor coating 17 by an ultraviolet source 18 (FIG. 3). Suitably, second-color light which illuminates the screen 13 or is produced by excitation of the phosphor 17** is a short wavelength visible color of maximum color saturation, such as blue-green.

In another alternative embodiment of the method of the invention, a lightbeam 21 containing image information from a projector 22 is passed through a filter 23 to produce the monochrome color beam 24 which is projected onto a viewing screen 25. The illumination of a second visually distinguishable color is superimposed on the monochrome color image on the screen 25 by projecting a lightbeam 26 of the second color uniformly over the surface of the viewing screen 25. The resulting multi-color image can be viewed from one side of the screen 25 or the other, depending on whether the screen 25 is reflective or translucent.

Having fully described my invention in such clear and concise terms as to enable those skilled in the art to which it pertains to understand and practice it, I claim:

1. A method of providing a luminous multi-color image, comprising the steps of:

a. forming a luminous variative-intensity monochrome color image having bright, dark and intermediate areas; and
b. simultaneously uniformly superimposing on said monochrome image an illumination of a second visually distinguishable color;

the intensity of said superimposed illumination being adjusted such that the bright areas of said variative-intensity image appear in said monochrome color, the dark areas thereof appear in said second color and the intermediate areas thereof appear in colors which are a mixture of said monochrome color and said second color.

2. Method of claim 1 in which said monochrome color image is formed by a. forming a luminous variative-intensity image on a viewing screen; and
b. interposing between said viewing screen and the viewer a transparent filter which filters said image to provide said variative-intensity monochrome color image.

3. Method of claim 1 in which said monochrome color image is formed by a. filtering a luminous variative-intensity image to a monochrome color image; and
b. projecting said monochrome color image onto a viewing screen.

4. Method of claim 1 in which said second color is superimposed on said monochrome color image by projecting ultraviolet light onto a transparent viewing screen impregnated with a phosphor which emits said second visually distinguishable color when excited, said viewing screen being placed between said monochrome color image and the viewer.

5. Method of claim 1 in which said second color is superimposed on said monochrome color image by projecting light of said second visually distinguishable color onto a viewing-scattering screen placed between said monochrome color image and the viewer.

6. Method of claim 1 in which said second visually distinguishable color is superimposed on said monochrome image by projecting light of said second visually distinguishable color directly onto a viewing screen on which said monochrome color image is formed.

7. Method of claim 1 in which said second visually distinguishable color is superimposed on said monochrome image by projecting ultraviolet light directly onto the viewing screen on which said monochrome color image is formed, said screen being impregnated with a UV-excitable phosphor which emits said second color when excited.

* * * * *